United States Patent
Zong et al.

(10) Patent No.: US 12,404,979 B1
(45) Date of Patent: Sep. 2, 2025

(54) PASSIVE LUMINESCENT CABLE

(71) Applicant: Shanghai Lanhao Electric Co., Ltd., Shanghai (CN)

(72) Inventors: Lei Zong, Shanghai (CN); Bingbing Wang, Shanghai (CN); Dengkai Cao, Shanghai (CN); Chunyan Liu, Shanghai (CN); Jingjing Ding, Shanghai (CN)

(73) Assignee: Shanghai Lanhao Electric Co., Ltd., Shanghai (CN)

( * ) Notice: Subject to any disclaimer, the term of this patent is extended or adjusted under 35 U.S.C. 154(b) by 0 days.

(21) Appl. No.: 18/899,581

(22) Filed: Sep. 27, 2024

(30) Foreign Application Priority Data

Jul. 19, 2024 (CN) .......................... 202410979491.2

(51) Int. Cl.
| | |
|---|---|
| *F21S 4/26* | (2016.01) |
| *H01B 7/36* | (2006.01) |
| *H02J 50/00* | (2016.01) |
| *F21W 131/10* | (2006.01) |
| *F21W 131/402* | (2006.01) |

(52) U.S. Cl.
CPC ............... *F21S 4/26* (2016.01); *H01B 7/36* (2013.01); *H02J 50/001* (2020.01); *F21W 2131/1005* (2013.01); *F21W 2131/402* (2013.01)

(58) Field of Classification Search
CPC .................................. F21S 4/26; H02J 50/001
See application file for complete search history.

(56) References Cited

U.S. PATENT DOCUMENTS

| | | | | |
|---|---|---|---|---|
| 11,965,628 | B1* | 4/2024 | Zong | H01B 9/005 |
| 2015/0214746 | A1* | 7/2015 | Lopez Gomez | H01B 7/0275 |
| | | | | 29/605 |
| 2022/0146087 | A1* | 5/2022 | Poulin | F21V 15/00 |
| 2022/0154923 | A1* | 5/2022 | Poulin | E21F 17/18 |
| 2023/0290541 | A1* | 9/2023 | Caliani | F21V 33/00 |
| 2025/0037902 | A1* | 1/2025 | Qian | H01B 7/0823 |

FOREIGN PATENT DOCUMENTS

CN 117012451 A 11/2023

* cited by examiner

*Primary Examiner* — Christopher E Dunay
(74) *Attorney, Agent, or Firm* — ARC IP Law, PC; Joseph J. Mayo

(57) ABSTRACT

Provided is a passive luminescent cable. The passive luminescent cable includes a cable core and an outer sheath. The outer sheath is wrapped outside the cable core, and the cable core includes at least a power wire core, a ground wire core, an electromagnetic field energy collection wire core and a light strip. The electromagnetic field energy collection wire core includes a magnetic conducting wire core and multiple first conductor wires. Each first conductor wire is wound outside the magnetic conducting wire core to form a coil, and two ends of the first conductor wire are respectively connected to two electrodes of the light strip to form a loop. The outer sheath and a protective sleeve of the light strip are made of a light-transmitting material.

9 Claims, 5 Drawing Sheets

PASSIVE LUMINESCENT CABLE

CROSS-REFERENCE TO RELATED APPLICATION

This patent application claims the benefit and priority of Chinese Patent Application No. 202410979491.2 filed with the China National Intellectual Property Administration on Jul. 19, 2024, the disclosure of which is incorporated by reference herein in its entirety as part of the present application.

TECHNICAL FIELD

The present disclosure relates to the technical field of cables, and in particular to a passive luminescent cable.

BACKGROUND

The traditional cable containing LED (light-emitting diode) light strip needs to be connected to the low-voltage power supply through the electric cabinet to light the LED lamp. However, the voltage of the electric cabinet in open-pit coal mines and other occasions in general is not suitable for the LED light strip, which leads to the fact that the visual function in the traditional cable containing LED light strip cannot be applied in practice, and makes the composite LED light strip technology in existing cables become useless.

A relatively advanced technology abroad is a cable containing LED light strip. A magnetic conducting wire is wound outside at least one power wire, and a lamp bead wire is wound around the magnetic conducting wire. This method has the disadvantages that the power wire will become thick. In addition to that the outer diameter of the cable is greatly thickened and the cable becomes bulkier due to the double-layer insulation, the light strip of the cable using this technology is fragile, and the cable cannot withstand towing and moving, and can only be used as a fixed laying, otherwise, the light strip will be easily damaged.

Based on the above reasons, the inventors of this application have initially invented some schemes to solve the above problems, for example, in the scheme described in the Chinese patent application with application No. CN202310843074.0, the coil and the LED light strip are integrated to generate electricity themselves for the consumption by the LED light strip. However, the inventors found that the above schemes have the following two problems:

Firstly, the electricity generated per unit time is small, which can only meet the needs of low-power lamp beads.

Secondly, as an inductance core is usually fragile ferrite and needs to be welded to the PCB (printed circuit board), the light strip formed by the compounding of the inductance core and the LED has poor tensile effect, and bending resistance, and the cable cannot withstand towing and moving, and can only be fixedly laid, otherwise, the light strip will be easily damaged.

Based on this, there is an urgent need for a novel scheme to solve the above problems.

SUMMARY

An objective of the present disclosure is to provide a passive luminescent cable to solve the problems in the prior art. By arranging a bending-resistant, impact-resistant and extrusion-resistant electromagnetic field energy collection wire core and a light strip, the light strip is driven by the wire core to work, such that the light strip can be lit without an external power supply to ensure visual function of the cable at night, so as to guarantee that the cable is not crushed in the operating process, and to guarantee the safe use of the cable. In addition, an upper limit of the amount of electricity that can be generated by the electromagnetic field energy collection wire core is greatly increased, and the work requirements of the higher power light strip can be met.

To achieve the objective above, the present disclosure employs the following technical solution:

The present disclosure provides a passive luminescent cable layer, including a cable core and an outer sheath, wherein the outer sheath is wrapped outside the cable core, the cable core comprises at least a power wire core, a ground wire core, an electromagnetic field energy collection wire core and a light strip; the electromagnetic field energy collection wire core comprises a magnetic conducting wire core, and a plurality of first conductor wires; the plurality of first conductor wires is wound outside the magnetic conducting wire core to form coils, and both ends of each of the plurality of first conductor wires are respectively connected to two electrodes of the light strip to form a loop; and the outer sheath and a protective sleeve of the light strip are made of a light-transmitting material.

Preferably, the magnetic conducting wire core is formed by stranding multiple thin magnetic conducting wires.

Preferably, a material of the magnetic conducting wire core comprises, but is not limited to, an iron-nickel alloy material and an iron material.

Preferably, each first conductor wire includes a conductive core and an insulating layer wrapped outside the conductive core.

Preferably, the magnetic conducting wire core is wrapped with an isolation tape or/and an extruded polymer material protective layer; and the magnetic conducting wire core is externally wound with the plurality of first conductor wires and then wrapped with the isolation tape or/and the extruded polymer material protective layer.

Preferably, a diameter of the magnetic conducting wire core, a wire diameter of each of the plurality of first conductor wires wound outside the magnetic conducting wire core and a number of the plurality of first conductor wires are determined according to one or more factors of specification of the power wire core, an outer diameter requirement of the cable and energy required by the light strip.

Preferably, the light strip is formed by connecting a plurality of LED (light-emitting diode) lamp beads in parallel, series or a combination of parallel and series by a second conductor wire; the protecting sleeve outside the LED lamp beads and the second conductor wire are fabricated by a light-transmitting material extrusion process; and the protective sleeve is single-layered or double-layered, and the protective sleeve is a loose jacket layer or a combination of a tight protective sleeve and a loose protective sleeve.

Preferably, multiple power wire cores are provided, an accommodating gap is formed between every two adjacent power wire cores of the plurality of power wire cores, and the electromagnetic energy collection wire core and the light strip are respectively placed in two accommodating gaps, or the electromagnetic field energy collection wire core and the light strip are placed in a same accommodating gap.

Preferably, the power wire core of the cable comprises a power wire conductor, and a power wire core insulating layer; as required, the power wire core further comprises a conductor shielding layer, an insulation shielding layer and a metal shielding layer; and the metal shielding layer is woven by copper wires, iron wires or alloy wires.

Preferably, the cable core further includes one or more of a ground wire core, a control wire core, a communication wire core, a grounding detection wire core and an optical fiber unit. One or more power wire cores are provided.

Compared with the prior art, some embodiments have the following technical effects.

The present disclosure provides a passive luminescent cable. After cable loading equipment starts to work, the electromagnetic field energy collection wire core transmits collected electric energy to the light strip to drive the light strip to be lit. The light strip can be driven without an external power supply and without affecting the performance of the cable, the visual capacity of the cable at night is improved, the cable is prevented from being crushed and damaged by engineering vehicles, and the safe use of the cable is guaranteed. Meanwhile, the electromagnetic field energy collection wire core and the lamp strip are both designed with bending resistance, impact resistance and durability. Moreover, the upper limit of the induced electromotive force generated by the electromagnetic field energy collection wire core is greatly increased, and the work requirements of the higher power light strip can be met.

BRIEF DESCRIPTION OF THE DRAWINGS

To describe the technical solutions of the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
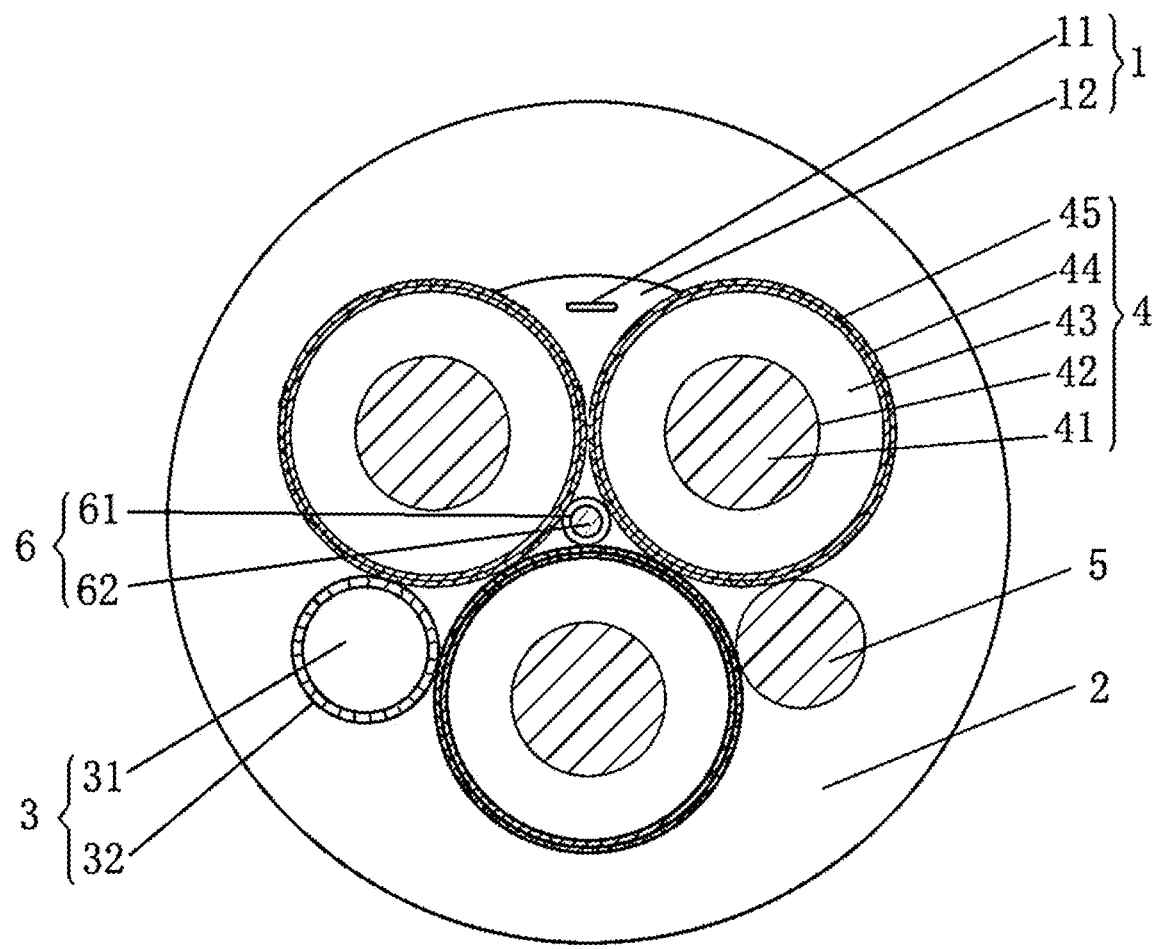
FIG. 1 is a structural schematic diagram of a passive LED luminescent cable according to an embodiment of the present disclosure.
Figure 2:
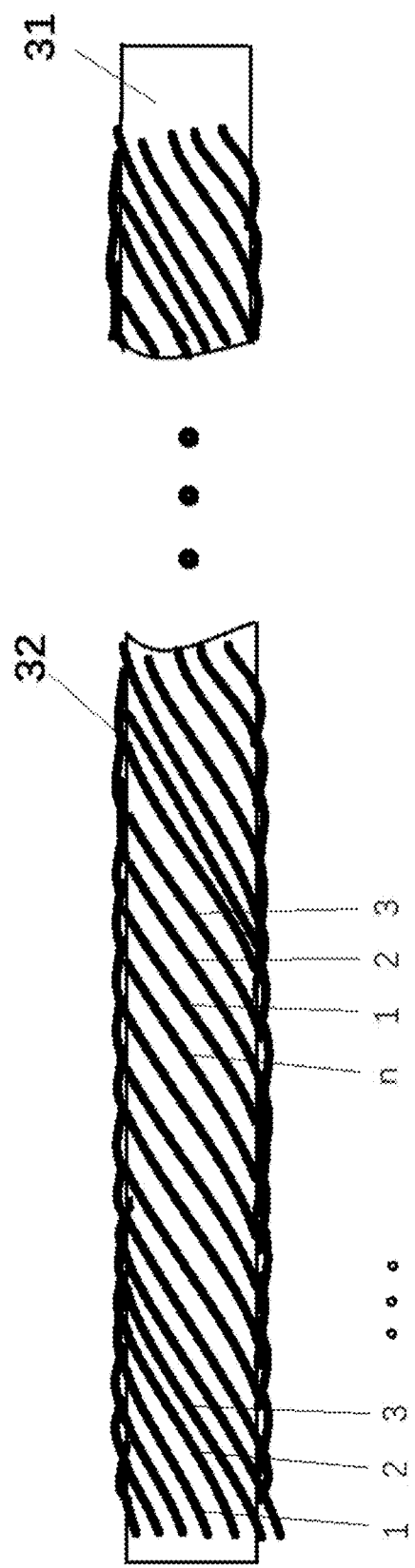
FIG. 2 is a structural schematic diagram of an electromagnetic field energy collection wire core according to an embodiment of the present disclosure.

In the drawings: 1 light strip; 11 LED lamp beads; 12 protective sleeve; 2 outer sheath; 3 energy collection wire core; 31 magnetic conducting wire core; 32 coil; 4 power wire core; 41 power wire conductor; 42 power wire core conductor shielding layer; 43 power wire core insulating layer; 44 insulation shielding layer; 45 metal shielding layer; 5 ground wire core; 6 grounding detection wire core; 61 detection wire core insulation layer; 62 detection wire core conductor.

DETAILED DESCRIPTION OF THE EMBODIMENTS

The technical solutions in the embodiments of the present disclosure will be described clearly and completely hereinafter with reference to the drawings of the embodiments of the present disclosure. Apparently, the described embodiments are some embodiments of the present disclosure, rather than all of the embodiments. Based on the embodiments of the present disclosure, all other embodiments obtained by those skilled in the art without paying creative labor fall in the scope of protection of the present disclosure.

In order to make the objectives, features and advantages of the present disclosure more clearly, the present disclosure is further described in detail below with reference to the accompanying drawings and specific embodiments.

Figure 3:
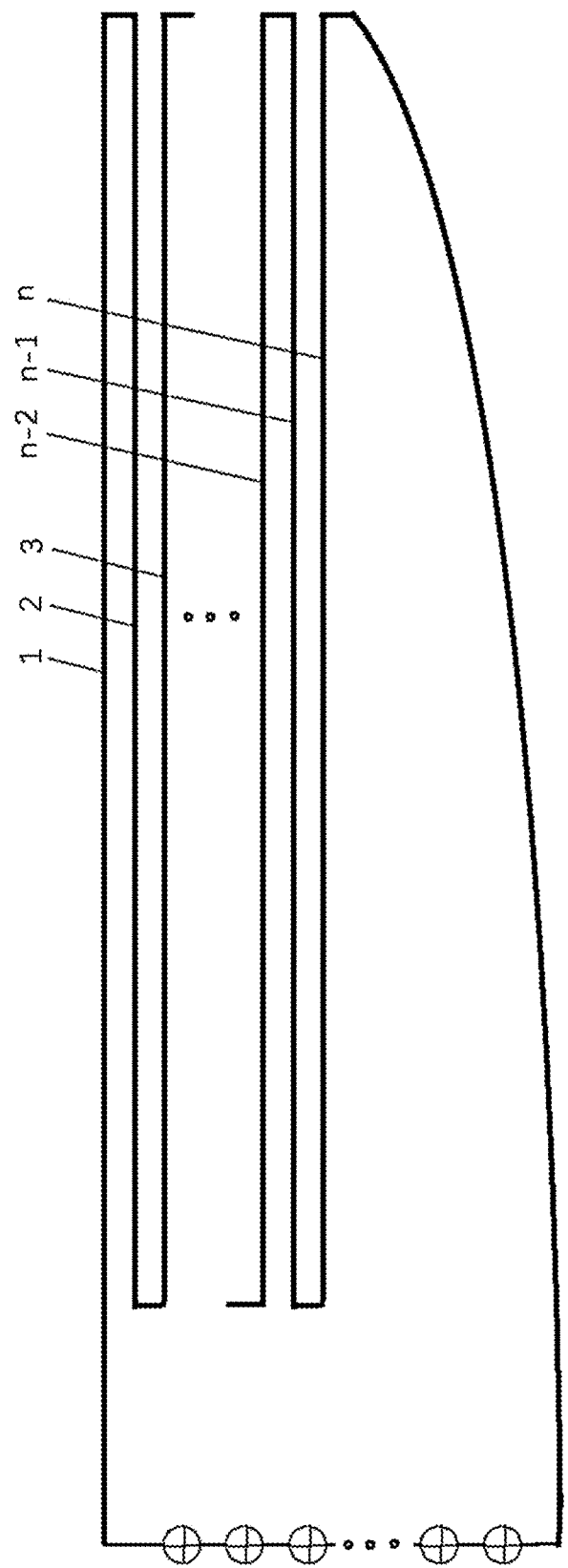
FIG. 3 is a schematic diagram of coils of an energy collection wire core connected to a light strip in series according to an embodiment of the present disclosure.
Figure 4:
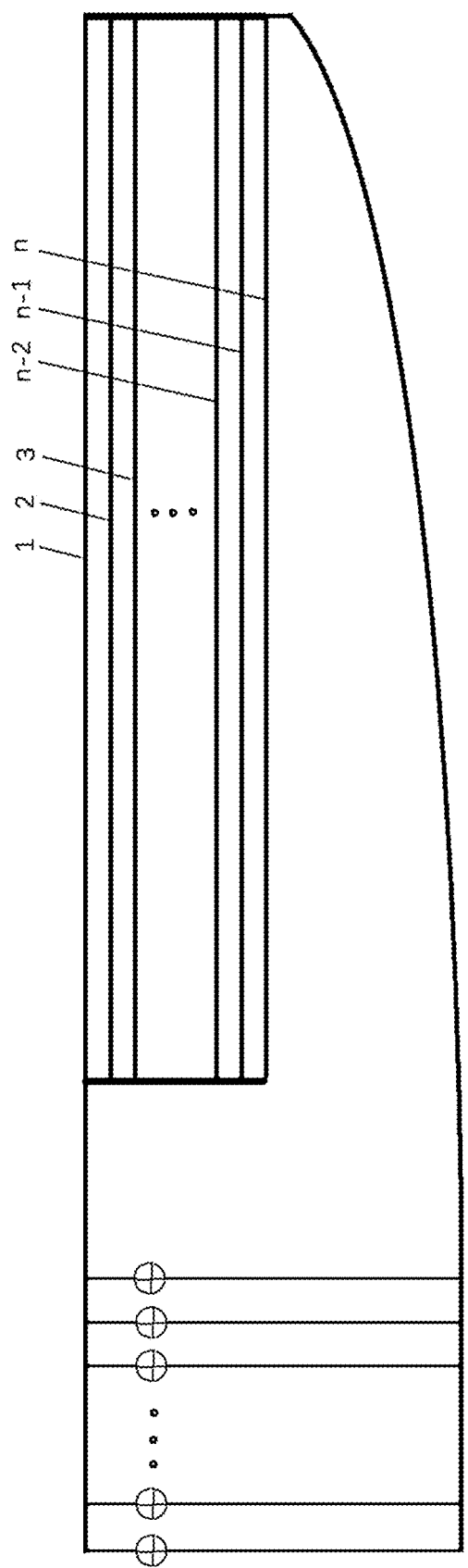
FIG. 4 is a schematic diagram of coils of an energy collection wire core connected to light strips in parallel according to an embodiment of the present disclosure.
Figure 5:
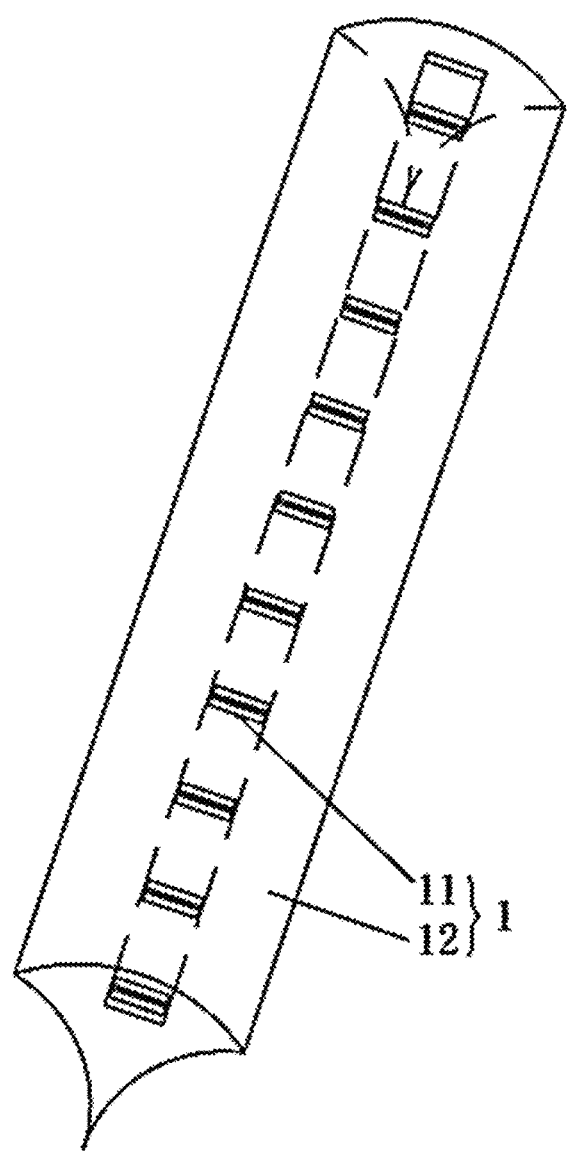
FIG. 5 is a structural schematic diagram of a special-shaped LED light strip according to an embodiment of the present disclosure.

Reference numerals 1, 2 and 3 in the following embodiments are the structures shown in FIG. 1 and FIG. 5, and the numerals 1, 2, and 3 in FIG. 3 and FIG. 4 are the first, second and third first conductor wires, respectively.

The present disclosure provides a passive luminescent cable, as shown in FIG. 1 to FIG. 5, including a cable core and an outer sheath 2. The outer sheath 2 is wrapped outside the cable core, the cable core includes at least a power wire core 4, an electromagnetic field energy collection wire core 3 and a light strip 1. The electromagnetic field energy collection wire core 3 includes a magnetic conducting wire core 31 and multiple first conductor wires. Each first conductor wire is wound outside the magnetic conducting wire core 31 to form a coil 32, both ends of the first conductor wire are respectively connected to two electrodes of the light strip 1 to form a loop. The outer sheath 2 and a protective sleeve 12 of the light strip 1 are made of a light-transmitting material.

After the cable is electrified and a load of the cable works, a current flow through the power wire core 4 of the cable and radiates an electromagnetic field to the outside, and an induced potential is generated in the coil 32 of the electromagnetic field energy collection wire core 3 arranged beside the power wire core 4. As shown in FIG. 3 and FIG. 4, multiple coils 32 are connected in series, parallel or a combination of series and parallel to form two output electrodes, and the lamp beads of the light strip 1 are also connected in series, parallel or a combination of series and parallel to form two receiving electrodes. The two output electrodes of the energy collection wire core 3 can be connected to the two receiving electrodes of the light strip 1 to drive the light strip 1, thus improving the visual capacity of the cable at night, preventing the cable from being crushed and damaged by an engineering vehicle, and ensuring the safe use of the cable.

The most important is that the magnetic conducting wire core 31 in the electromagnetic field energy collection wire core 3 provided by the present disclosure is made of a bendable material, and thus has bending resistance, impact resistance and durability. Moreover, multiple coils 32 can be wound outside the magnetic conducting wire core 31, such that the upper limit of the induced electromotive force generated by the coils 32 is greatly increased, and the work requirements of the higher power light strip 1 can be met. The higher the power, the greater the intensity of the light emitted by the light strip 1, such that it can better remind the staff of the location of the cable. Meanwhile, the light strip provided by the present disclosure also employs a bend-resistant, impact-resistant and durable structural design, and thus the service life of the light strip is greatly improved.

It should be noted that the coil 32 defined in the present disclosure is a spiral structure or an annular structure formed by winding one first conductor wire around the magnetic conducting wire core 31. So that the multiple coils 32 are formed by winding multiple first conductor wires around the magnetic conducting wire core 31.

In some embodiments, the magnetic conducting wire core 31 is formed by stranding multiple thin magnetic conductive wires, such that the magnetic conducting wire core 31 is soft, can be conveniently stranded into a cable, and is suitable for towing and moving during the use of the cable.

In some embodiments, the material of the magnetic conducting wire core 31 includes, but is not limited to, an iron-nickel alloy material and an iron material. That is, the material of the thin magnetic conductive wire is the iron-nickel alloy material, the iron material or other alloy materials with good magnetic conductivity.

In some embodiments, the first conductor wire may be an enameled wire, or a thin conductor wire coated with other insulating materials. It can be seen that the first conductor wire includes a conductive core and an insulating layer wrapped outside the conductive core.

In some embodiments, the first conductor wire in this embodiment can be wound in a single layer or multiple layers outside the magnetic conducting wire core 31, and multiple first conductor wires in each layer are wound side by side, and a winding pitch-diameter ratio is not limited, but should not be too small or too large. The number of winding layers of the first conductor wire depends on the electric energy required by the light strip 1. An enameled wire with a diameter of 0.2-0.5 mm is preferred for the first conductor wire, but the use of enameled wires or insulated wires with other wire diameters is not excluded.

In some embodiments, the magnetic conducting wire core 31 may be wrapped with an isolation tape and then wound with the enameled wire, and after the enameled wire is wound, the isolation tape or/and an extruded protective polymer jacket may be wrapped. Specifically, the isolation tape is preferably a cotton tape.

In some embodiments, a diameter of the magnetic conducting wire core 31, a wire diameter of the first conductor wire wound outside the magnetic conducting wire core and the number of the first conductor wires are determined according to one or more factors of specification of the power wire core 4, an outer diameter requirement of the cable, and energy required by the light strip 1, which can be easily calculated and determined by a person of ordinary skill in the art, and thus will not be repeated here.

In some embodiments, the light strip 1 is formed by connecting multiple LED lamp beads 11 in parallel, series, or a combination of parallel and series by a second conductor wire. The protective sleeve 12 outside the LED lamp beads 11 and the second conductor wire 12 is fabricated by light-transmitting material extrusion process. The protective sleeve 12 is single-layered or double-layered, and the protective sleeve 12 is a loose jacket or a combination of a tight protective sleeve and a loose protective sleeve.

The second conductor wire is a connecting soft wire, and the soft wire and the multiple LED beads 11 connected to the soft wire form a main body of the light strip 1, and the protective sleeve 12 of the light strip 1 is wrapped outside the main body, and the protective sleeve 12 is made of a transparent or translucent polymer material, such as PE (polyethylene), PVC (polyvinyl chloride), silicone rubber, polyurethane and other transparent protective layers. The light strip 1 is circular, rectangular, elliptical or trapezoidal, but is not limited to the above shapes.

In some embodiments, the LED lamp beads 11 may be in a single row or multiple rows, or single-color or multi-color, and can be configured to increase the visual and eye-catching effect of the cable. In other embodiments, there may be multiple LED light strips 1, the LED light strip 1 in the cable can be placed at any position around the cable core.

In some embodiments, multiple power wire cores 4 are provided, and an accommodating gap is formed between every two adjacent power wire cores 4. The electromagnetic energy collection wire core 3 and the light strip 1 are respectively placed in two accommodating gaps, or the electromagnetic field energy collection wire core 3 and the light strip 1 are placed in the same accommodating gap. The electromagnetic field energy collection wire core 3 provided by this embodiment will not occupy extra space of the cable, and will not increase the diameter of the original cable.

In some embodiments, the power wire core 4 of the cable includes a power wire conductor 41 and a power wire core insulating layer 43.

In this embodiment, a power wire core conductor shielding layer 42 can be arranged between the power wire conductor 41 and the power wire core insulating layer 43, and the power wire core insulating layer 43 is externally provided with an insulation shielding layer 44 and a metal shielding layer 45. In specific embodiments, according to the rated voltage of the cable and the general requirements of cable technology, whether the power wire core conductor shielding layer 42, the insulation shielding layer 44 and the metal shielding layer 45 are needed can be determined. The existence of the power wire core conductor shielding layer 42, the insulation shielding layer 44 and the metal shielding layer 45 or the change of materials may affect the efficiency of energy collection, but cannot fundamentally affect the feasibility of the implementation of the present disclosure.

In a specific embodiment, the metal shielding layer 45 of the power wire core 4 may be in the form of metal wire winding.

The metal wire of the metal shielding layer 45 of the power wire core 4 may be a copper wire, an iron wire or an alloy wire.

In some embodiments, the cable core further includes one or more of a ground wire core 5, a communication wire core and a grounding detection wire core 6.

In this embodiment, the grounding detection wire core 6 includes a detection wire core conductor 62 and a detection wire core insulating layer 61 wrapped outside the detection wire core conductor 62. The ground wire core 5 is configured to be grounded, and the grounding detection wire core 6 is configured to detect on-off condition of grounding.

In other embodiments, the cable core further includes a control wire core and an optical fiber unit. The ground wire core 5 and the grounding detection wire core 6 may not be provided in the cable, and the ground wire core 5 and the ground detection wire core 6 in the cable may be replaced by the control wire core and the optical fiber unit.

In some embodiments, there may be one, two or three power wire cores 4, and there may be one or more energy collection wire cores 3 attached to the power wire core to collect an electromagnetic field radiated by the power wire conductor 41 when the current flows through the power wire conductor 41.

In some embodiments, the stranding pitch-diameter ratio of the light strip 1, the ground wire core 5, the energy collection wire core 3 and the power wire core 4 is 2-30, which makes the light strip 1, the ground wire core 5, the power wire core 4 and the energy collection wire core 3 more closely fit each other, thus ensuring the stable operation of each of the light strip 1, the three power wire cores 4, the ground wire core 5 and the energy collection wire core 3.

In some embodiments, the outer sheath 2 of the cable is made of a transparent or light-transmitting polymer material so as to ensure the visualization of the light strip 1, increase the visualization effect of the cable, enable the cable to be clearly seen at night and in dark environment, prevent the cable from being crushed and damaged by surrounding engineering vehicles and equipment, and improve the safety performance of the cable.

In some embodiments, the outer sheath 2 of the cable can be provided with two or more light-transmitting sheaths as required, and whether the number of sheaths is increased or not does not affect the implementation of the technology of the present disclosure.

In this specification, specific embodiments aim to illustrate the principle and implementation of the present disclosure. The explanation of the above embodiments is only used to help understand the method and its core idea of the present disclosure. According to the idea of the present disclosure, there will be some changes in the specific implementation and application scope for those skilled in the art. To sum up, the contents of this specification should not be construed as limiting the present disclosure.

What is claimed is:

1. A passive luminescent cable, comprising:
    a cable core and an outer sheath;
    wherein,
        the outer sheath is wrapped outside the cable core;
        the cable core comprises a plurality of power wire cores, a ground wire core, an electromagnetic field energy collection wire core and a light strip;
        the electromagnetic field energy collection wire core comprises a magnetic conducting wire core, and a plurality of first conductor wires;
        the plurality of first conductor wires is wound outside the magnetic conducting wire core to form coils, and both ends of each of the plurality of first conductor wires are respectively connected to two electrodes of the light strip to form a loop;
        the outer sheath and a protective sleeve of the light strip are made of a light-transmitting material; and,
        the electromagnetic field energy collection wire core is arranged beside the plurality of power wire cores, wherein an accommodating gap is formed between every two adjacent power wire cores of the plurality of power wire cores, and the electromagnetic field energy collection wire core and the light strip are respectively placed in two accommodating gaps, or the electromagnetic field energy collection wire core and the light strip are placed in a same accommodating gap, the electromagnetic field energy collection wire core does not increase the diameter of the passive luminescent cable.

2. The passive luminescent cable according to claim 1, wherein the magnetic conducting wire core is formed by stranding a plurality of thin magnetic conducting wires.

3. The passive luminescent cable according to claim 1, wherein a material of the magnetic conducting wire core comprises an iron-nickel alloy material and an iron material.

4. The passive luminescent cable according to claim 1, wherein each of the plurality of first conductor wires comprises a conductive core and an insulating layer wrapped outside the conductive core.

5. The passive luminescent cable according to claim 1, wherein the magnetic conducting wire core is wrapped with an isolation tape or/and an extruded polymer material protective layer; and the magnetic conducting wire core is externally wound with the plurality of first conductor wires and then wrapped with the isolation tape or/and the extruded polymer material protective layer.

6. The passive luminescent cable according to claim 1, wherein a diameter of the magnetic conducting wire core, a wire diameter of each of the plurality of first conductor wires wound outside the magnetic conducting wire core and a number of the plurality of first conductor wires are determined according to one or more factors of specification of the plurality of power wire cores, an outer diameter requirement of the cable and energy required by the light strip.

7. The passive luminescent cable according to claim 1, wherein the light strip is formed by connecting a plurality of light-emitting diode (LED) lamp beads in parallel, series or a combination of parallel and series by a second conductor wire; the protecting sleeve outside the LED lamp beads and the second conductor wire are fabricated by a light-transmitting material extrusion process; and the protective sleeve is single-layered or double-layered, and the protective sleeve is a loose jacket layer or a combination of a tight protective sleeve and a loose protective sleeve.

8. The passive luminescent cable according to claim 1, wherein each of the plurality of power wire cores of the cable comprises a power wire conductor, and a power wire core insulating layer; each of the plurality of power wire cores further comprises a conductor shielding layer, an insulation shielding layer and a metal shielding layer; and the metal shielding layer is woven by copper wires, iron wires or alloy wires.

9. The passive luminescent cable according to claim 1, wherein the cable core further comprises one or more of a control wire core, a communication wire core, a grounding detection wire core and an optical fiber unit.

* * * * *